United States Patent

[11] 3,633,310

[72] Inventor Burton B. Sandiford
     Placentia, Calif.
[21] Appl. No. 853,531
[22] Filed Aug. 27, 1969
[45] Patented Jan. 11, 1972
[73] Assignee Union Oil Company
     Los Angeles, Calif.

[54] REGULATION OF IRRIGATION WATER
     7 Claims, No Drawings
[52] U.S. Cl. .................................................. 47/58,
                          61/36, 260/41, 47/DIG. 10
[51] Int. Cl. ..................................................... E02d 3/12
[50] Field of Search ........................................... 47/9, 58,
                          DIG. 10; 61/36; 260/37, 41

[56]           References Cited
          UNITED STATES PATENTS
2,625,529  1/1953  Hedrick et al. ................  47/58 X
2,652,379  9/1953  Hedrick et al. ................  260/41
2,745,815  5/1956  Mussell .........................  260/37
2,763,961  9/1956  Trommsdorff et al. .......  47/58
2,801,984  8/1957  Morgan et al. ................  260/41
3,118,832  1/1964  Katzer et al. ..................  61/36 X
3,268,002  8/1966  Fischer ..........................  61/36 X
          FOREIGN PATENTS
788,677    1/1958  Great Britain ................  47/DIG. 10

Primary Examiner—Robert E. Bagwill
Attorneys—Milton W. Lee, Richard C. Hartman, Lannas S. Henderson, Dean Sandford and Robert E. Strauss ABSTRACT: A method for improving the irrigation of highly permeable surface soils is described wherein the soils are contacted with an effective amount of an aqueous solution of a partially hydrolyzed polyacrylamide to reduce the water permeability of the soil without rendering the soil impermeable to waterflow. The invention has application for irrigation of sandy and highly permeable soils which experience a rapid loss of water from the root zone following irrigation by drainage or percolation, as well as rapid evaporation and drying by movement of the water to the surface. The soils are contacted with a solution having a concentration of about 0.0001 to about 1 weight percent of a polyacrylamide having from 5 to about 80 percent of its amide groups hydrolyzed to carboxylic acid groups. This treatment is performed periodically or annually so as to reduce the permeability of the soil to subsequent irrigation waters.

REGULATION OF IRRIGATION WATER

DESCRIPTION OF THE INVENTION

This invention relates to a treatment of agricultural soils and in particular relates to a treatment of highly permeable surface soils to reduce the water permeability of the soils and thereby reduce loss of water from the root zone.

Sandy and highly water permeable soils are frequently encountered in the practice of irrigation since many of these soils have been reclaimed by irrigation from arid and semidesert areas. Irrigation of these soils frequently results in a rapid loss of water by percolation of water away from the root zone. In addition, the soils have a tendency to rapidly dry by evaporation since the moisture in the soil readily moves to the surface from which it is evaporated. This rapid drying of the highly permeable soils results in a requirement that the soils be irrigated more frequently than desirable.

It is an object of this invention to provide a method for treatment of surface soils to reduce the permeability of water therethrough.

It is likewise an object of this invention to provide the method for the irrigation of such soils.

Other and related objectives will be apparent from the following paragraphs.

I have now found that the aforementioned objectives can be achieved by the contacting of the soils with an effective amount of an aqueous solution of a partially hydrolyzed polyacrylamide to reduce the water permeability of the soil without rendering the soil impermeable to waterflow. The contacting of the soil can be performed periodically by the addition of a small amount of the aforementioned partially hydrolyzed polyacrylamide to the irrigation water supplied to the soil. Thereafter, conventional irrigation practice is followed by the application of water to the soil when necessary to maintain the water content of the soil above the minimum amount corresponding to the permanent wilting value. The soil can be contacted with the solution of the partially hydrolyzed polyacrylamide frequently during the irrigating season or, the treatment can be applied annually or semiannually. The necessity for the application of the treatment can be readily determined by taking test cores of the surface soil, i.e., the upper 6 to upper 18 inches, and measuring the rate of waterflow through the test core. The necessity for retreatment of the soil can also be determined by observing the frequency by which the soil requires irrigation and when the period between irrigations is substantially reduced from that immediately following the polymer treatment, the soil is again necessary for retreatment by contacting with the aqueous solution of the partially hydrolyzed polyacrylamide.

The polymer useful in the invention comprises a partially hydrolyzed polyacrylamide which is obtained by the polymerization, preferably homopolymerization, of acrylamide. If desired, however, up to about 10 weight percent of other vinyl monomers such as vinyl acetate, acrylonitrile, methyacrylonitrile, vinyl alkyl ethers, vinyl chloride and the like can be employed, provided that the copolymers so obtained are characterized by water solubility and freedom from crosslinking. The acrylamide is polymerized by suitable vinyl polymerization initiators, e.g., free radical forming compounds such as the azo compounds, e.g., azobisisobutyronitrile, azobisisobutyro-amidine chloride, etc.; peroxides such as hydrogen peroxide, sodium peroxide, benzoyl peroxide, alkyl peroxides such as t-butyl hydrogen peroxides; and dialkyl peroxides such as diethylperoxides, di-t-butyl peroxide, etc.; alkali metal persulfates, etc.

These polymers are characterized by high-molecular weight, e.g., 300,000 to about 15,000,000, preferably from about 500,000 to about 5,000,000. The viscosity of aqueous solutions of the polymers are reflective of the molecular weight of the polymers, higher molecular weight polymers imparting greater viscosities at the same concentrations than that of the lower molecular weight polymers. Accordingly, the minimum molecular weight for the polymers used in this invention is sufficient that a 0.5 weight percent aqueous solution of the polymer has a viscosity of at least about 6 centipoises at 25° C. as determined in a standard Ostwald viscosimeter.

For use in the invention, the polyacrylamide polymers are partially hydrolyzed to the extent that from 5 to about 80, preferably from about 7 to about 65, and most preferably from about 12 to about 45 percent of the amide groups of the polymer are hydrolyzed to carboxylic acid or water soluble carboxylate groups. The resultant acid groups can be present as the carboxylic acid or as water-soluble carboxylates such as the ammonium, alkali metal and alkaline earth metal salts thereof, e.g., sodium, potassium, cesium, lithium, calcium, magnesium, etc.

The hydrolysis of the polyacrylamide can be performed after the preparation of the polymer by prolonged exposure of an aqueous solution of the polymer to elevated temperatures and pH in the presence of alkali metal hydroxides or carbonates. It is similarly possible to prepare the partially hydrolyzed polyacrylamide by a step of simultaneously polymerizing and hydrolyzing the resultant polymer. Such a method is described in U.S. Pat. No. 3,022,279 wherein an aqueous solution containing at least about 5 percent by weight of acrylamide, a free radical polymerization initiator and sodium carbonate at a concentration of from 10 to 67 molar percent of the acrylamide are heated to a temperature from about 20° to 55° C. to initiate the polymerization and simultaneously polymerize and hydrolyze the polymer to the desired partially hydrolyzed composition. Another technique for the simultaneous polymerization and hydrolysis of the polymer comprises performing the polymerization with an aqueous solution containing at least about 5 percent acrylamide and an alkali metal polyphosphate in an amount from about 5 to 25 molar percent based on the acrylamide using a free radical catalyst initiator and a temperature from about 25° to 80° C. to initiate the polymerization while retaining the resultant solution at the elevated temperature for a sufficient time to hydrolyze from 5 to about 80 percent of the amide groups to the carboxylic or carboxylate groups. The necessary time to effect the hydrolysis whether it is performed concurrently with or after the polymerization of the acrylamide is from about 5 to about 20 hours, preferably from about 8 to about 12 hours, and is sufficient to effect the aforementioned partial hydrolysis of the acrylamide groups. The partially hydrolyzed polymers are also commercially available as dried powders under the trade designations of Separan NP20, Pusher 500 or 700, ET601, from the Dow Chemical Company.

The partially hydrolyzed polyacrylamide is employed in an aqueous solution which contains from about 0.001 to about 1 weight percent of the polymer. At this concentration the polymer will exhibit a viscosity from 2 to about 1,000 centipoises. Preferably the concentration is adjusted to provide a solution having a viscosity from about 5 to 100 centipoises. The polymer can be dissolved in ordinary irrigation water by simple admixing of the polymer with the irrigation water, or preferably, the polymer is dissolved in an aqueous concentrate having a concentration from about 0.5 to about 2.0 weight percent of the polymer and thereafter this concentrate can be blended into the irrigation water in a sufficient quantity to provide the aforementioned desired concentration of the polymer in the solution which is contacted with the surface soil.

The contacting of the surface soil with the solution containing the partially hydrolyzed polyacrylamide need only be performed periodically, whenever the permeability of the soil has increased to an undesirable level as reflected by the greater frequency for irrigation necessary to maintain soil moisture above a permanent wilting value or as determined by obtaining a core of the surface soil and measuring the permeability of waterflow therethrough. The partially hydrolyzed polyacrylamide polymers are quite stable in soils, however, after prolonged periods some of the polymer can be removed from the soil by washing and/or bacterial action. Accordingly, it is necessary to periodically retreat the soil and this retreatment can be as infrequently as once each year or each growing season or can be made after each cultivation of the soil.

The amount of the treating solution can be varied as necessary to effect the desired reduction in permeability of the soil. Generally this amount can comprise from 0.05 to about 5 volumes of solution per pore volume of the soil, preferably from about 0.1 to about 2 volumes per pore volume. The treatment is applied to the soil surrounding the root zone of the particular crop, e.g., the upper 18 inches, preferably the upper 6 inches of the soil surface is treated with the solution. The degree of penetration of the treating solution can be readily controlled by the amount of solution applied during a single treatment.

The necessity for irrigation can be determined as in the conventional practice, e.g., by the use of field instruments for the determination of the soil moisture content as reflected by the soil suction pressure which ranges from about 0.85 to 15 bars, the 15-bar value reflecting the permanent wilting point of most soils. An electrode-type resistance unit suitable for measurement of soil moisture content independently of the physical characteristics of the soil is described in "Soil Science," Volume 97, pages 108–112.

The invention will now be described by reference to the following example which demonstrates the results obtainable thereby:

EXAMPLE 1

A laboratory test core of a Nevada No. 130 sand, 1 inch diameter and 3 inches in length, was prepared. The pore volume of the sand core comprised 15 milliliters. The sand was unconsolidated in the core sample and water readily permeated therethrough. The test core was connected to water supply means with facilities to measure the rate of waterflow therethrough under a hydrostatic head of 6 inches water. Under these conditions it was observed that the waterflow rate through the sand core was 10 milliliters in 5 minutes, 7 seconds. An aqueous solution of partially hydrolyzed polyacrylamide designated as Pusher 700 was dissolved in water at a concentration of 0.2 weight percent. The solution had a viscosity of 98 centipoises when measured at 6 r.p.m. on a bland viscosimeter and 74.4 centipoises when determined at 12 r.p.m. on the viscosimeter. The aqueous solution was contacted with the sand core under a hydrostatic head of 21 inches of water and a rate of flow through the said core comprises 10 milliliters over a period of 180 minutes, 5 seconds. Thereafter irrigating water was again supplied to the core under a hydrostatic head of 6 inches of water and passed through the core for a period 6 hours, until the previous aqueous solution of the partially hydrolyzed polyacrylamide had been thoroughly displaced from the core. Thereafter, the rate of flow of the water through the sand core was measured and the following flow rates were determined at the hydrostatic head of 6 inches water:

| Cumulative Volume of Water Flow | Rate of Flow |
| --- | --- |
| 75 milliliters | 10 ml. in 28 min./32 sec. |
| 100 milliliters | 10 ml. in 16 min./54 sec. |
| 175 milliliters | 10 ml. in 26 min./8 sec. |
| 325 milliliters | 10 ml. in 32 min./37 sec. |

The above data illustrate that the sand core exhibited a permanently reduced permeability to waterflow. The quantity of water passed through the sand core after the aqueous solution had been thoroughly washed from the sands was the equivalent of about 25 inches of water or approximately 2 acre feet of water per acre, corresponding to the amount typically used in semiarid areas during a growing season.

The aforementioned example is intended solely to demonstrate the results obtainable by my invention. It is obvious that my invention can be practiced in accordance with the procedure set forth in the aforementioned specification and that modifications of use employing obvious equivalents can be used without departing from the scope of the invention.

I claim:

1. The method of irrigating highly water-permeable surface soils to reduce the quantity of irrigation water required for plant growth which comprises: (1) contacting said soil with an effective amount of an aqueous solution of a partially hydrolyzed polyacrylamide having a mol weight from 300,000 to 15,000,000, sufficient to provide a 0.5 weight percent aqueous solution thereof with a viscosity of at least 6 centipoises at 25° C. and having from 5 to about 80 percent of its amide groups hydrolyzed to carboxylic acid groups to reduce the water permeability of said soil without rendering said soil impermeable to water flow; and (2) thereafter irrigating said soil with water having none of said polyacrylamide at periodic intervals as required to maintain the water content of the soil above the amount corresponding to the permanent wilting value.

2. The method of claim 1 wherein said aqueous solution contains from 0.001 to 1.0 weight percent of said polymer.

3. The method of claim 2 wherein said polymer has from 12 to 45 percent of its amide groups hydrolyzed to carboxyl groups.

4. The method of claim 2 wherein said treating solution is applied to said soil in an amount from 0.05 to about 5 volumes of solution per pore volume of said soil.

5. The method of claim 2 wherein said treating solution is applied to said soil in an amount from 0.1 to about 2 volumes of solution per pore volume of said soil.

6. The method of claim 1 wherein said polymer has from 7 to 65 percent of its amide groups hydrolyzed to carboxyl groups.

7. The method of claim 1 wherein the permeability of said soil is periodically measured and the irrigation with said aqueous solution is performed when the permeability of the soil is found to have increased to an undersired level.

* * * * *